(12) United States Patent
Aldred et al.

(10) Patent No.: US 9,568,807 B2
(45) Date of Patent: Feb. 14, 2017

(54) METHOD AND APPARATUS FOR CLEANING TRANSPARENT ENCLOSURE FOR SUBMERSIBLE CAMERA

(71) Applicant: Wild Goose Imaging Inc., Boulder, CO (US)

(72) Inventors: Jeffrey Kent Aldred, Boulder, CO (US); Alexis Stuart Foreman, Boulder, CO (US); Trevor Mendelow, Boulder, CO (US); Michael Park, Longmont, CO (US)

( * ) Notice: Subject to any disclaimer, the term of this patent is extended or adjusted under 35 U.S.C. 154(b) by 1070 days.

(21) Appl. No.: 13/667,962

(22) Filed: Nov. 2, 2012

(65) Prior Publication Data

US 2013/0104933 A1 May 2, 2013

Related U.S. Application Data

(60) Provisional application No. 61/554,610, filed on Nov. 2, 2011, provisional application No. 61/665,649, filed on Jun. 28, 2012.

(51) Int. Cl.
| | |
|---|---|
| *G03B 17/02* | (2006.01) |
| *G03B 17/56* | (2006.01) |
| *G03B 17/08* | (2006.01) |
| *G02B 27/00* | (2006.01) |

(52) U.S. Cl.
CPC ............ *G03B 17/02* (2013.01); *G02B 27/0006* (2013.01); *G03B 17/08* (2013.01); *G03B 17/561* (2013.01); *Y10T 29/49826* (2015.01)

(58) Field of Classification Search
CPC ................................................. G02B 27/0006

USPC ........ 15/250.22, 250.001, 250.3; 348/81, 82, 348/E5.087, E7.087
See application file for complete search history.

(56) References Cited

U.S. PATENT DOCUMENTS

| | | | | |
|---|---|---|---|---|
| 3,493,804 | A | * 2/1970 | Fennell | ..................... B60S 1/60 15/250.002 |
| 4,427,385 | A |   1/1984 | Galerne | |
| 5,648,707 | A | * 7/1997 | Salliotte | ................ B60S 1/0807 15/250.17 |

(Continued)

FOREIGN PATENT DOCUMENTS

| | | | |
|---|---|---|---|
| JP | H0381929 U |   8/1991 | |
| JP | 10-216049   | * 8/1998 | ............... A47L 1/02 |

(Continued)

OTHER PUBLICATIONS

10-216049 (machine translation), 1998.*

*Primary Examiner* — Monica Carter
*Assistant Examiner* — Andrew A Horton
(74) *Attorney, Agent, or Firm* — Reilly Intellectual Property Law Firm (57) ABSTRACT

In a submersible camera housed within a spherical, transparent enclosure with instrumentation for driving the camera to different positions in photographing underwater activity, a cleaning arm is mounted on the external surface of the enclosure and is magnetically driven either by single or multiple drive magnets driven around an interior circular wall of the enclosure; and in the case of multiple drive magnets the cleaning arm has slave magnets in alignment with one or more drive magnets of opposite polarity to cause the cleaning arm to traverse the external surface of the enclosure at periodic intervals one or more cycles each time that the drive magnets are activated.

13 Claims, 11 Drawing Sheets

(56) References Cited

U.S. PATENT DOCUMENTS

| | | | |
|---|---|---|---|
| 6,527,000 B1* | 3/2003 | Randmae | B08B 3/024 134/102.1 |
| 6,581,754 B2* | 6/2003 | Law | B65G 45/16 15/256.51 |
| 2002/0152573 A1* | 10/2002 | Tsukui | B60S 1/08 15/250.3 |
| 2006/0230570 A1* | 10/2006 | Parris | B60R 11/04 15/250.22 |
| 2008/0072393 A1* | 3/2008 | Tanaka | A47L 1/02 15/250.03 |
| 2009/0092385 A1 | 4/2009 | Cullen et al. | |
| 2012/0113442 A1 | 5/2012 | Kyung et al. | |

FOREIGN PATENT DOCUMENTS

| | | | |
|---|---|---|---|
| JP | 2000299805 A | 10/2000 | |
| KR | 20020056849 A | 7/2002 | |
| KR | 20100111151 A | 10/2010 | |

\* cited by examiner

METHOD AND APPARATUS FOR CLEANING TRANSPARENT ENCLOSURE FOR SUBMERSIBLE CAMERA

CROSS REFERENCE TO RELATED APPLICATIONS

This application claims priority to U.S. Provisional Patent Application Ser. No. 61/554,610 filed Nov. 2, 2011 and U.S. Provisional Patent Application Ser. No. 61/665,649 filed Jun. 28, 2012 and are incorporated herein by reference.

BACKGROUND AND FIELD

The following relates to underwater cleaning systems and more particularly relates to a novel and improved method and apparatus for cleaning transparent enclosures for submersible remote-controlled cameras and the like.

Remote-controlled, submersible cameras are in widespread use, such as, monitoring underwater activities. For the purpose of illustration but not limitation, typically the camera system can be rotated or tilted over an extremely broad range by interfacing with a remote control that is capable of driving the camera to different positions. The camera is housed within a transparent enclosure, such as, a glass globe which is sealed in fixed relation to a base and which serves as an enclosure not only for the camera but for any instrumentation required in driving the camera to different desired positions. In addition, there is a need for a cleaning device which can be externally mounted on the enclosure to periodically clean or remove any foreign matter which collects on the external surface of the enclosure, and wherein the cleaning device can be periodically activated by instrumentation mounted internally of the enclosure and in such a way as to be remotely controlled in synchronization with the camera operation.

SUMMARY

It is therefore an object of the present invention to provide for a novel and improved cleaning apparatus for a transparent enclosure of a submersible camera together with a method of remotely controlling operation of the cleaning apparatus in association with camera operation in a reliable and efficient manner.

It is another object of the present invention to provide for a novel and improved magnetically controlled method and apparatus for cleaning the transparent enclosure of a submersible camera and which is readily conformable for use with different sizes and contours of transparent enclosures.

It is a further object to provide for an external cleaning arm which can be advanced along the external surface of a transparent enclosure for the camera system.

In a first embodiment for a submersible camera system mounted in a transparent, waterproof enclosure, an outer cleaning arm is mounted for rotation around an external surface of the enclosure, and a drive mechanism mounted internally of the enclosure is activated periodically to advance the cleaning arm around said transparent enclosure while maintaining a sealed relationship between the cleaning apparatus and the camera. In the first embodiment, the drive mechanism includes an internal magnetic block advancing around the inner wall of the enclosure and an external slave magnetic block aligned with and of opposite polarity to the drive magnet.

In a second embodiment, a series of drive magnets of opposite polarity are mounted on a drive block for advancement around the inner surface of the enclosure and a series of slave magnets of opposite polarity to one another are mounted on an external magnet block in aligned relation to the drive magnets and for the purpose of increasing magnetic intensity and locking engagement between the drive and slave blocks. In the embodiments described, the cleaning arm is characterized by being fixed at one end for rotation with the slave magnet(s) and journaled for rotation at the opposite end to the enclosure so as to maintain close engagement between the cleaning blade and external surface of the enclosure. Thus, for example, in a spherical enclosure, the cleaning arm will traverse the entire spherical contour of the enclosure between a lower circular wall provided for mounting of the drive mechanism and the opposite pole of the enclosure.

From the foregoing, in a method of monitoring underwater conditions with a submersible camera mounted in a waterproof, transparent enclosure, a cleaning arm is mounted externally of the enclosure, a rotational drive member is mounted internally of the enclosure for rotatably driving the cleaning arm, the enclosure being anchored along with the submersible camera at a predetermined depth in a body of water, and the cleaning arm is periodically activated to clean the external surface of the enclosure.

The above and other objects, advantages and features will become more readily understood from a consideration of the following detailed description when taken together with the accompanying drawings in which:

DETAILED DESCRIPTION OF DRAWINGS

DETAILED DESCRIPTION OF FIRST EMBODIMENT

Figure 1:
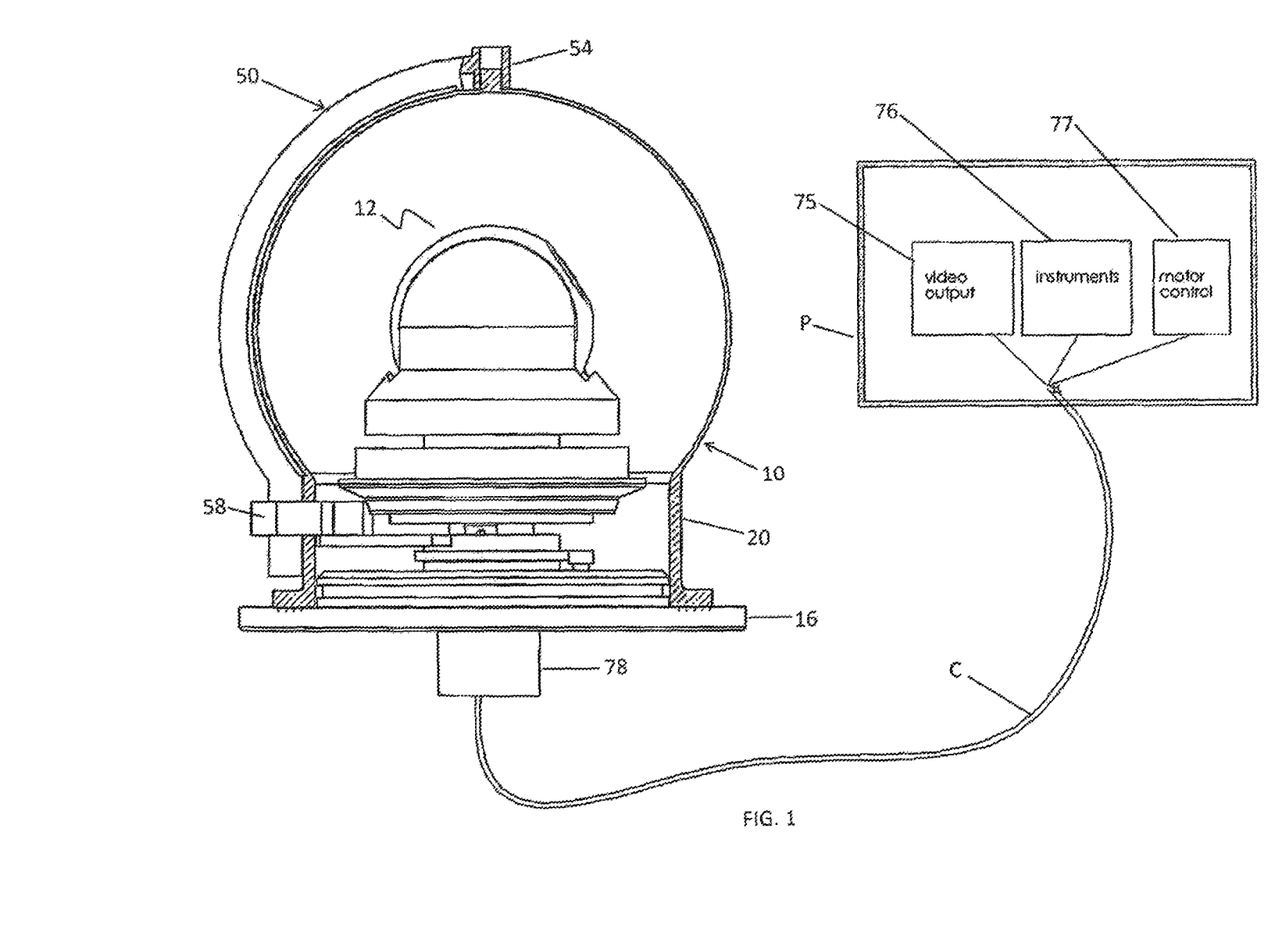
FIG. 1 is a view in elevation of one embodiment of the present invention and schematically illustrating the remote control instrumentation therefor.
Figure 2:
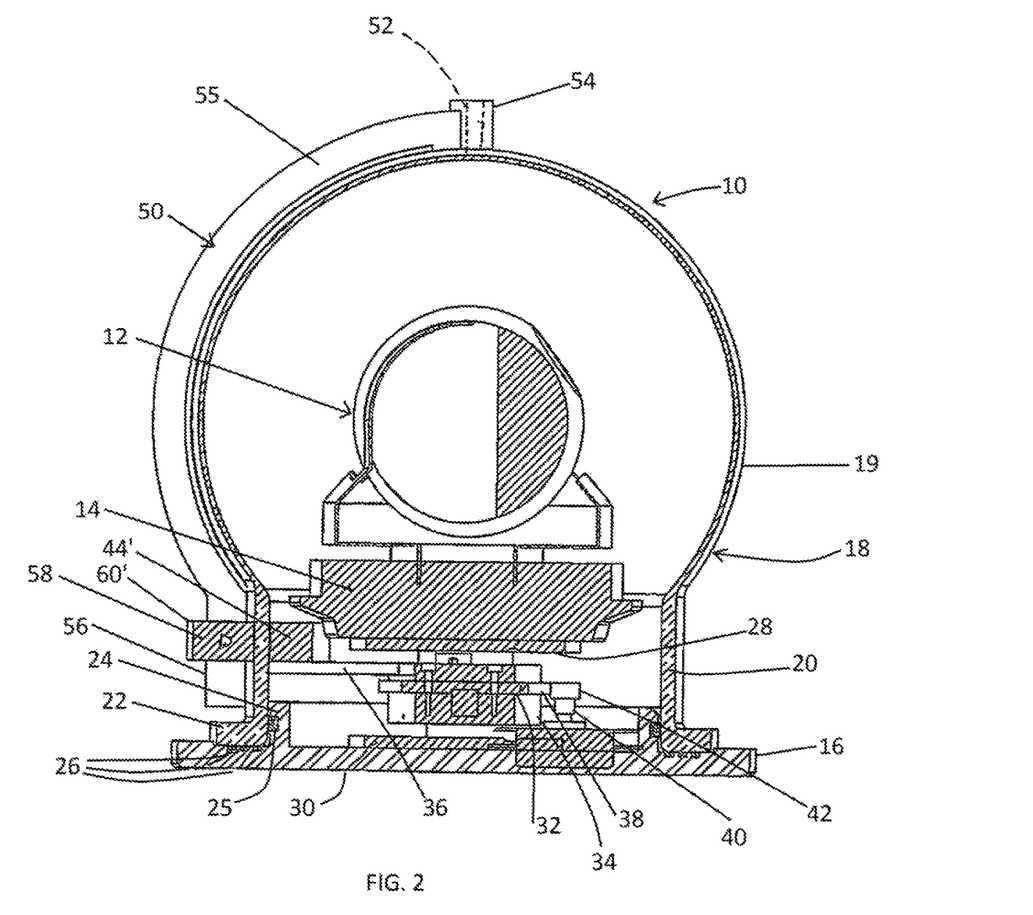
FIG. 2 is a cross-sectional view taken slightly off-center of the embodiment shown in FIG. 1.

Referring in more detail to the drawings, there is shown by way of illustrative example in FIGS. 1 and 2 a submersible camera system 10 broadly comprised of a camera 12 mounted for rotation on a camera base 14 within a waterproof enclosure made up of a system base 16 and transparent housing in the form of a globe 18. The housing 18 has an upper spherical portion 19 verging into a lower, hollow cylindrical wall 20 terminating in a flange 22 in outer surrounding, abutting relation to an upstanding ring-like circular wall 24 on the base 16. The ring-like wall portion 24 has an external groove 25, and the upper surface of the base 16 has a series of circumferential grooves 26, the grooves 25 and 26 receiving O-rings to establish sealed engagement with the abutting surfaces of the flange 22 and thereby establish a sealed enclosure for the camera 12 between the housing 18 and base 16. The camera 12 and its base 14 are centered within the housing 18 by upper and lower pedestals 28 and 30 which are fixed to the base 16 while retaining a bearing 32 within a bearing retainer 34 and in fixed relation to a drive arm 36 and ring gear 38, the latter being driven by a standard motor drive 40 via pinion gear 42. One such motor drive 40 is a planetary gear train pancake motor manufactured and sold by Ametek, Inc., Berwyn, Pa.

In a manner to be hereinafter described in more detail in relation to FIG. 3, the pinion gear 42 engages the ring gear 38 to rotate the arm 36 and an attached drive magnet block 44 in a circular path around the inner surface of the cylindrical wall 20, its rotation about a fixed axis being controlled by the bearing 32, the bearing retainer 34 being located on the outside race of the bearing 32. An alternate motor drive 40' is illustrated in FIG. 4.

An important feature of the one embodiment is the mounting of an outer cleaning arm 50 for rotation about a center post 52 projecting upwardly from the spherical wall surface 19 into a boss 54 at the upper end of the arm 50. The arm 50 is of arcuate configuration corresponding to the curvature of the external surface of the spherical wall 19 and traverses the entire vertical extent of the spherical wall surface 19 between the upper post 52 and the juncture of the spherical wall 19 and cylindrical wall 20. A lower straight vertical extension 56 of the arm 50 forms an integral continuation of the arcuate cleaning arm portion 55 for downward extension along the external surface of the cylindrical wall 20 and terminates in spaced adjacent relation to the flange 22. A slave magnet block 58 of opposite polarity to the drive magnet block 44 is fixed in surrounding relation to the vertical extension 56 within a sealed enclosure 60 and with its inner surface in abutting relation to the wall 20. The block 58 is aligned directly opposite to the magnet 44 and is of opposite polarity so as to be magnetically driven by the drive magnet 44 thereby forcing the entire arm 50 to rotate about the center axis through the vertical post 54 and around the entire circumference of the globe 18. In this way, the arm 50 is capable of undergoing rotation independently of the camera and vice-a-versa.

Figure 3:
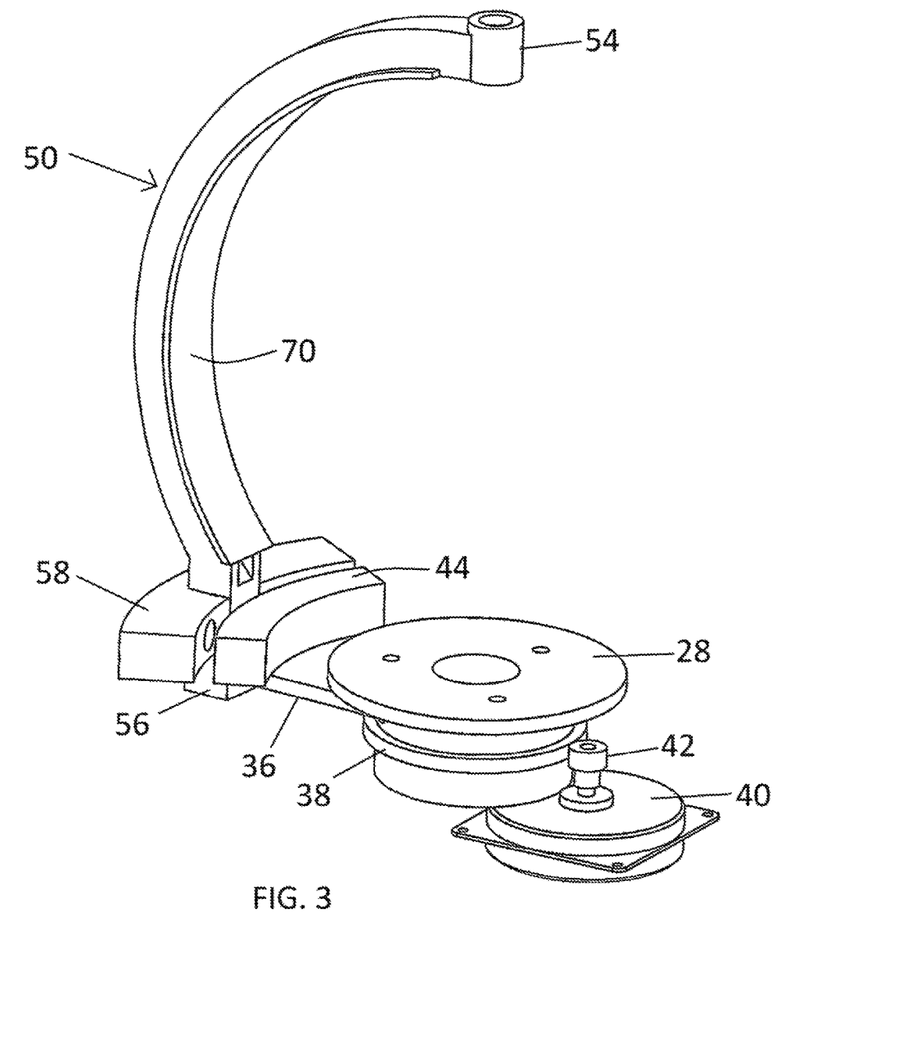
FIG. 3 is a perspective view of one form of drive mechanism utilized in driving an external cleaning arm rotationally about the transparent enclosure and showing one form of cleaning insert.
Figure 4:
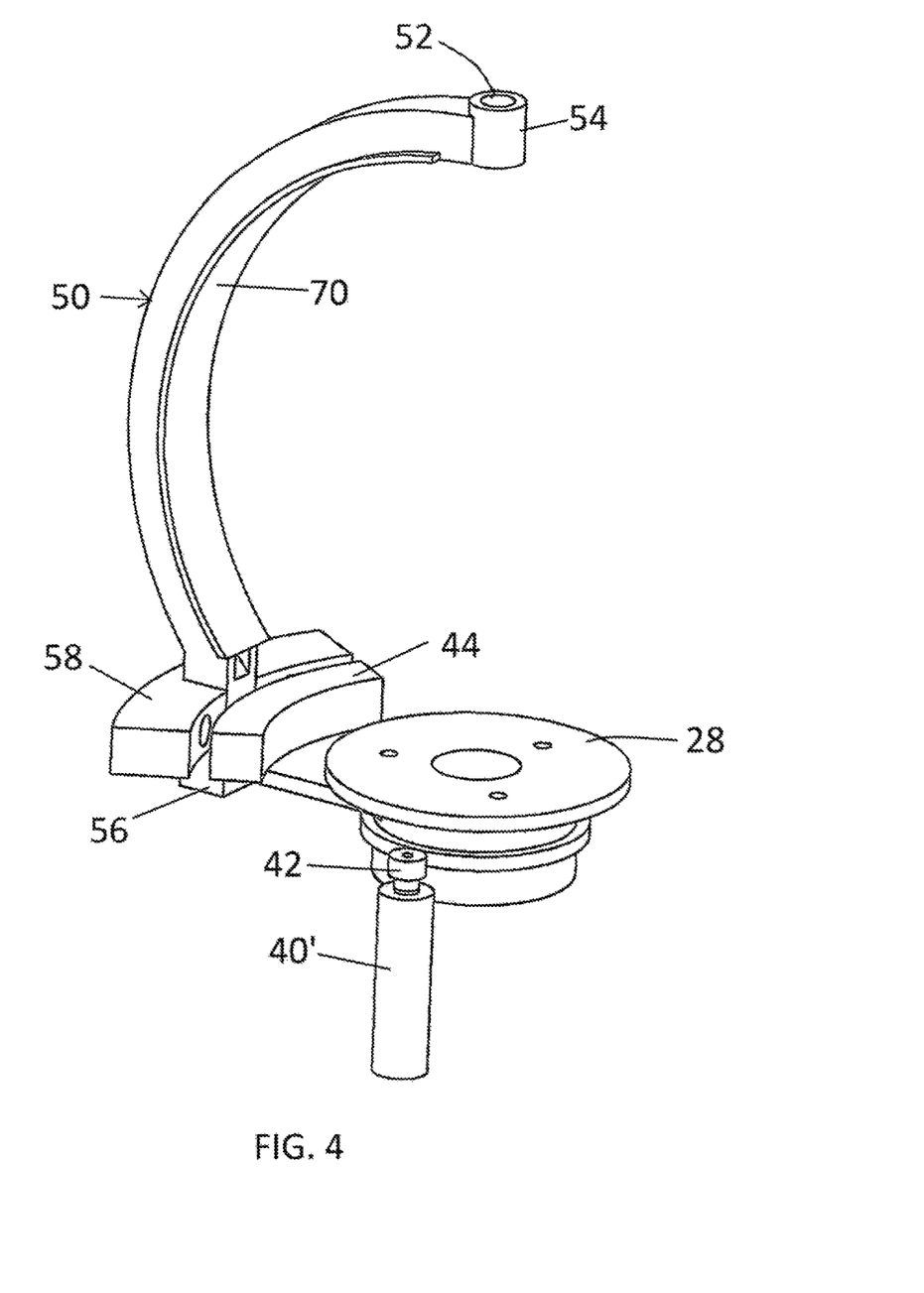
FIG. 4 is a perspective view of an alternate form of drive mechanism to that shown in FIG. 3 utilized in driving an external cleaning arm showing another form of cleaning insert.
Figure 5:
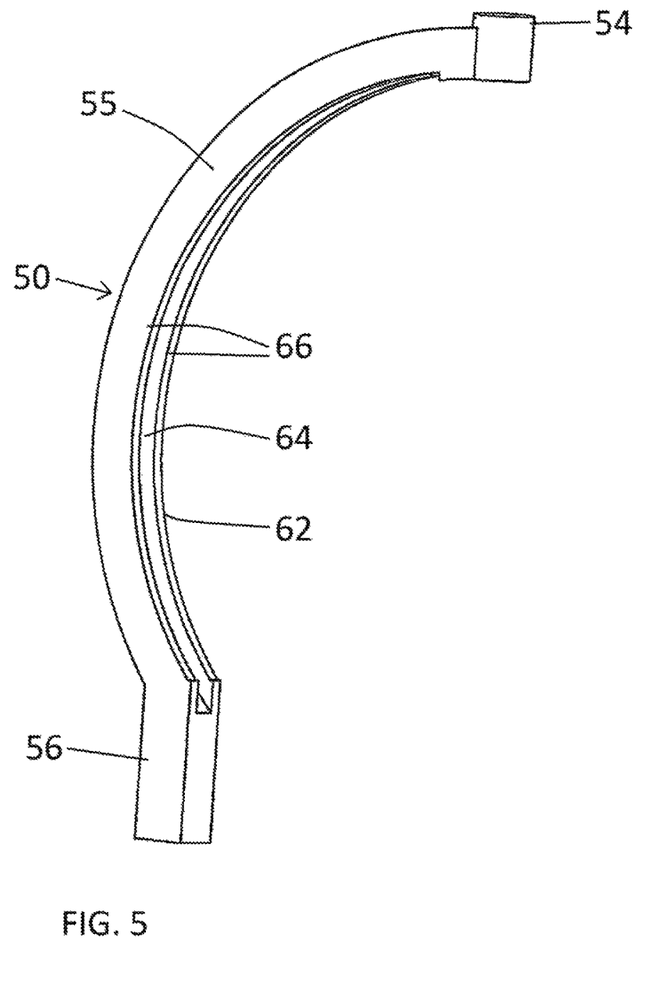
FIG. 5 is a perspective view in detail of the cleaning arm illustrated in FIGS. 1-4 without a cleaning insert.
Figure 6:
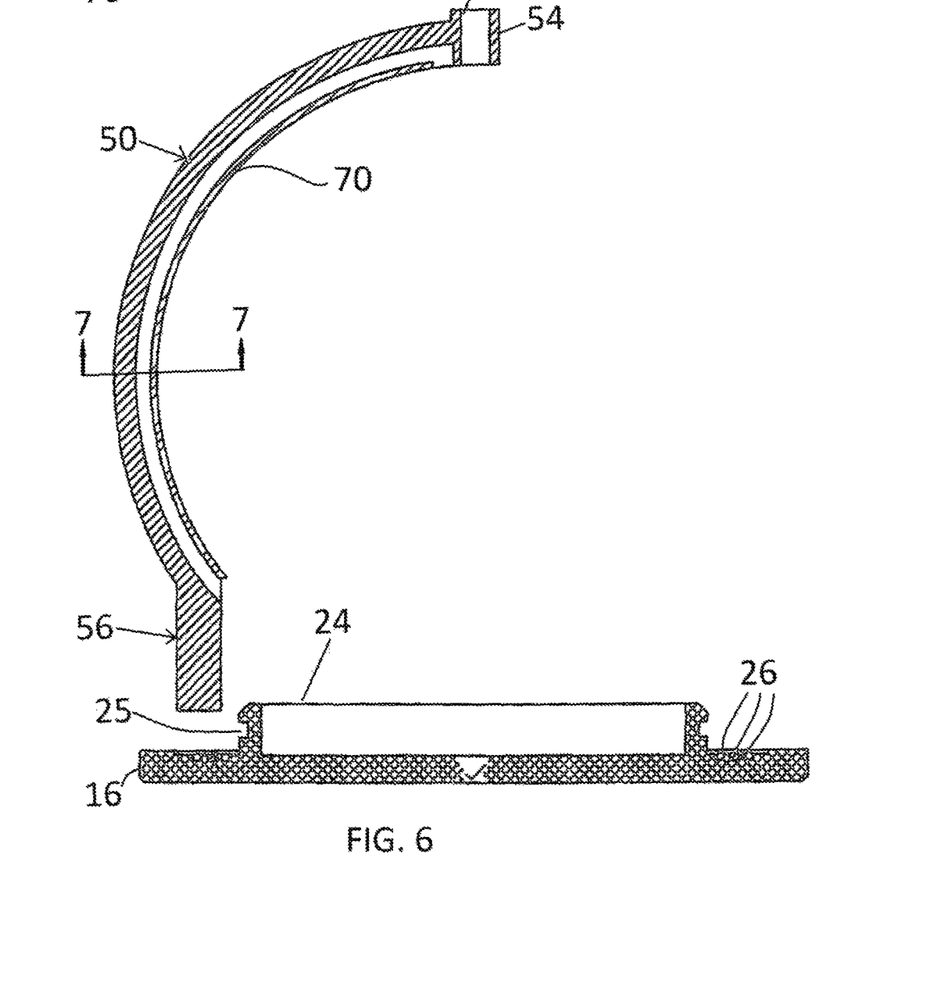
FIG. 6 is a cross-sectional view of the system base.
Figure 7:
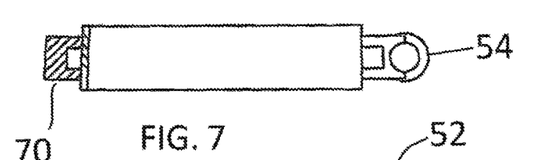
FIG. 7 is a cross-sectional view of the cleaning arm illustrating one type of wiper blade.
Figure 8:
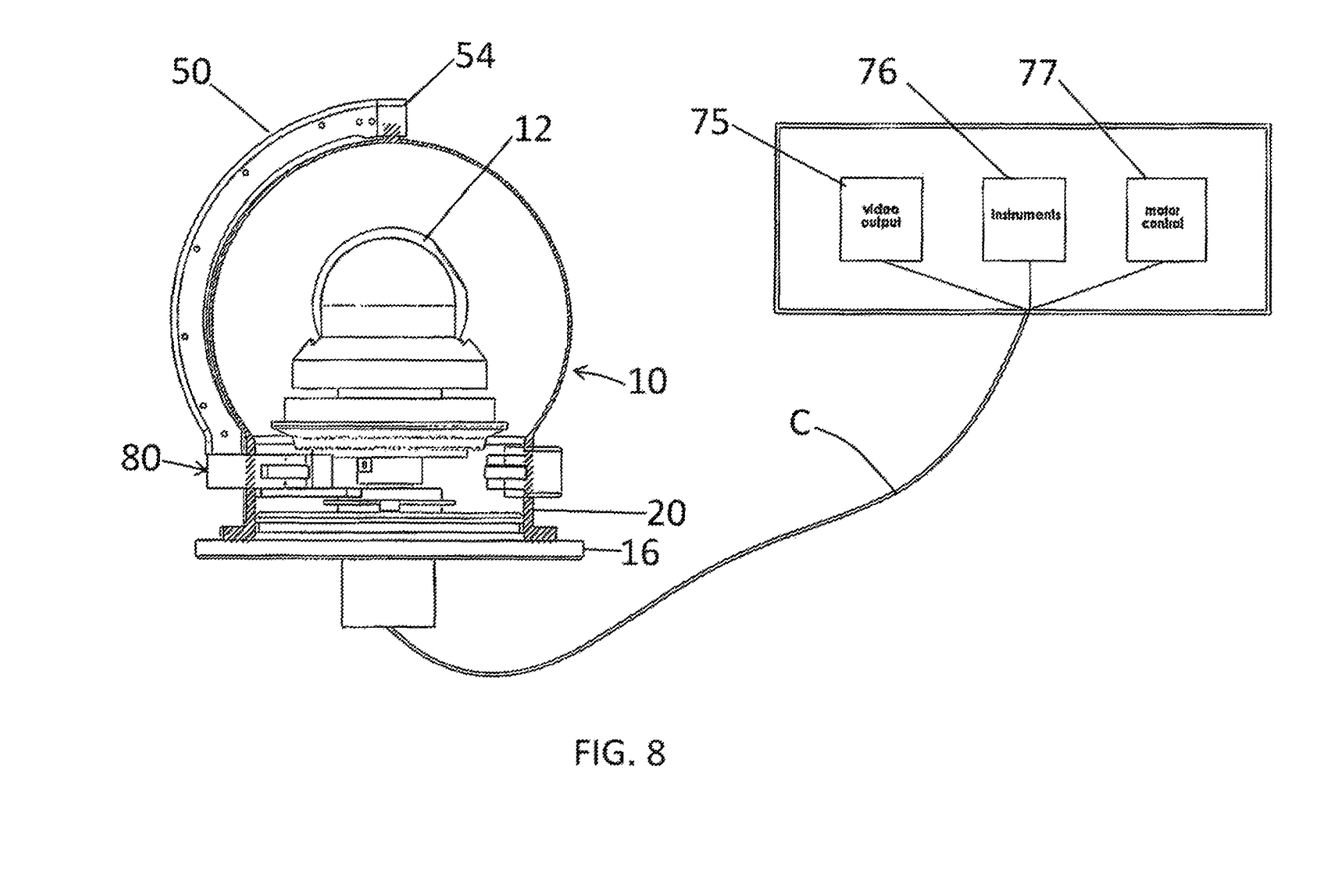
FIG. 8 is a view in elevation of an alternate embodiment and schematically illustrating the remote control instrumentation therefor.

Once again referring in more detail to FIGS. 3 and 4, the magnets 44 and 58 are both of arcuate configuration extending at right angles to the arm 50 and both conform to the curvature of the circular wall 20 of the globe 18. Both of the magnets 44 and 58 are of a limited length in relation to the circumference of the cylindrical wall 20, and their spacing is such as to be in close proximity to the inner and outer surfaces of the wall 20 without creating undue friction or resistance to their circular movement. Suitable magnets for this purpose are those manufactured and sold by K&J Magnetics, Inc., Jamison, Pa. In turn, as best seen from FIG. 5, the arm 50 is of generally rectangular cross-section having an inner facing surface 62 to the globe with a generally rectangular groove 64 extending the substantial length of the arcuate portion 55 of the arm and terminating in closely spaced relation to the boss 54. Furthermore, the sidewalls along the grooved inner surface 62 are indented so as to be spaced slightly from the surface of the globe. In this way, a scrubbing insert of generally T-shaped cross-section can be inserted into the groove 64. As illustrated in FIGS. 7 and 8, different scrubber materials may be employed, such as, a rubber or rubber-like blade 70 illustrated in FIG. 7 or a more abrasive material, such as, Scotch Brite® and either can be employed alone or in combination with a cleaning solution sprayed on to the external surface. In clearing off crustaceous materials, a metal scraper can be employed in place of the rubber blade 70 shown in FIG. 7. Other instrumentation may be employed both externally and internally of the enclosure including, for example, lighting and heating elements together with instrumentation for measuring temperature and salinity levels, all of which can be controlled remotely via cable C from a control panel P which includes the usual video controls at 75, instrument controls at 76 and motor controls 77 for the cleaning system. Typically, the cable C will extend through a watertight pass-through as designated at 78.

In operation, various types of cameras may be employed, such as the network camera manufactured and sold by Axis Communications AB, Lund, Sweden, such as, No. 534HD or T33 Series capable of traversing both the azimuth and elevation as well as other coordinates. Either can produce streaming video for display on a screen at a control center; and the camera system may include various instrumentation for testing salinity, temperature and other atmospheric conditions.

It will be apparent that the operation of the cleaning arm 50 can be synchronized with the network or surveillance camera operation and, for example, in utilizing the pancake motor drive 40 referred to may be rotated on the order of one rpm. Further, in actual practice, the entire camera and cleaning system can be attached to piling in shallow waters or can be anchored with a suitable concrete or metal block which will make the system negatively buoyant in deeper waters on the order of several hundred feet. It is to be understood that the globe or enclosure may be other than spherical and for example, may be cylindrical or oval-shaped as well as assume other curved configurations, particularly about an axis that will permit continuous rotation of the cleaning arm about the external surface of the enclosure.

DETAILED DESCRIPTION OF SECOND EMBODIMENT

Figure 9:
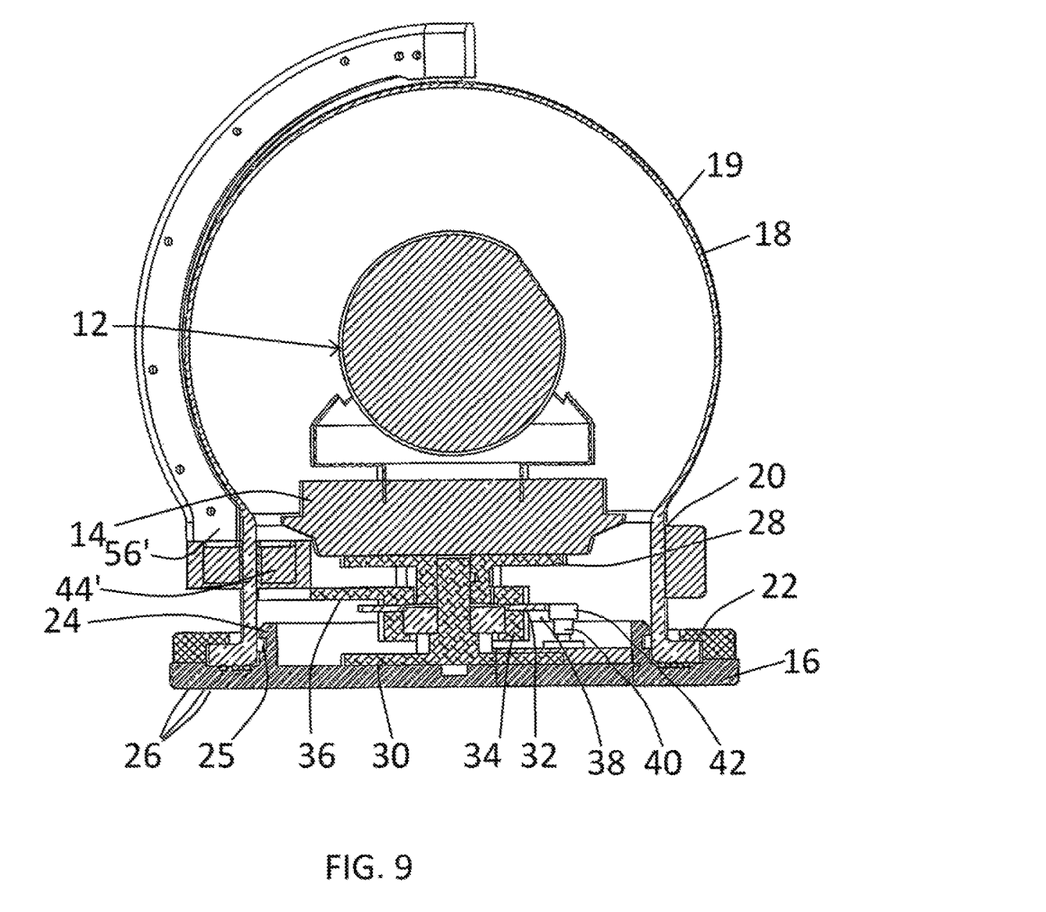
FIG. 9 is cross-sectional view taken slightly off center of the embodiment shown in FIG. 8.
Figure 10:
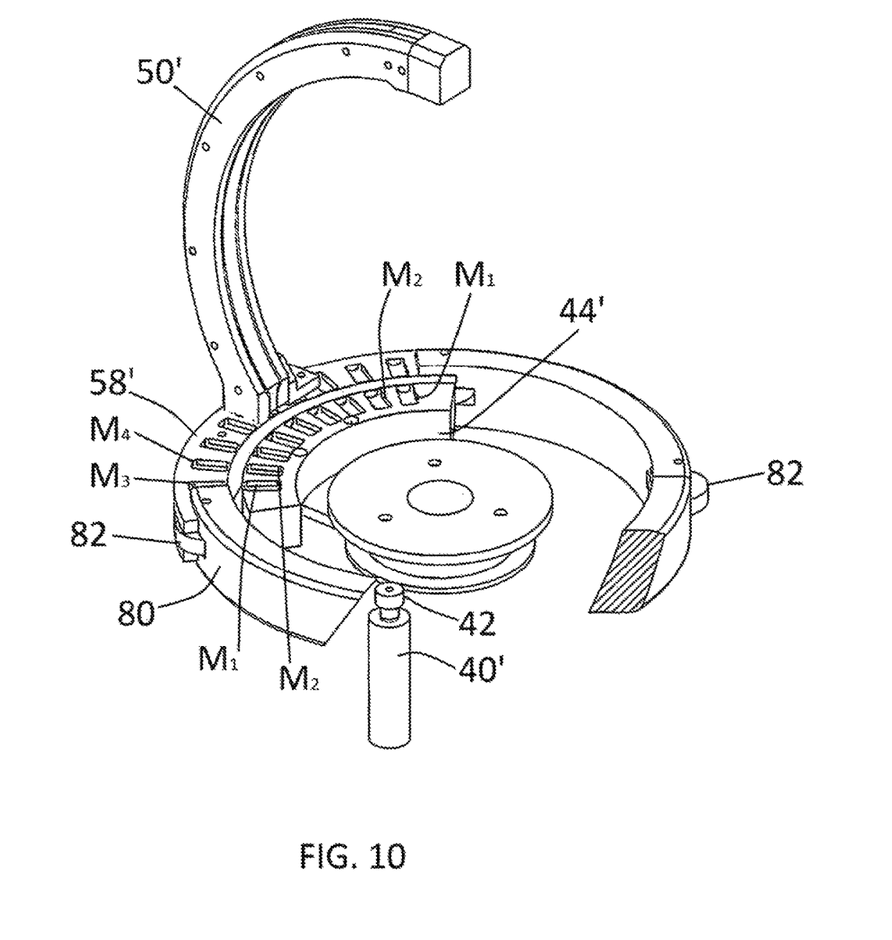
FIG. 10 is a somewhat perspective view of an alternate form of drive mechanism utilized in driving an external cleaning arm about the transparent enclosure shown in FIGS. 8 and 9.

In the second embodiment of FIGS. 8-12 like parts to those of FIGS. 1-6 are correspondingly enumerated, and in FIGS. 9 and 10 a pinion gear 42 engages ring gear 38 to rotate the arm 36 and attached drive magnet block 44' in a circular path around the inner surface of the cylindrical wall 20. Its rotation about a fixed axis is controlled by the bearing 32, and a bearing retainer 34 is located on the outside of the bearing 32. An alternate motor drive 40' corresponding to that of FIG. 4 is illustrated in FIG. 10.

As in the first embodiment, an outer cleaning arm 50' is mounted for rotation about center post 52 which projects upwardly from the spherical wall surface 19 into a boss 54 at the upper end of the arm. The lower straight vertical extension 56' of the arm 50 forms a continuation of the arcuate cleaning arm portion 55 for downward extension and positive connection into an outer surrounding belt or collar 80 which is mounted in surrounding relation to lower cylindrical wall 20 of the globe 19. As hereinbefore described, a pinion gear 42 engages the ring gear 38 to rotate the arm 36 and attached drive magnet block 44' in a circular path around the inner surface of the cylindrical wall 20; and a slave magnet block 58' of opposite polarity to the drive magnet block 44' is mounted in surrounding relation to the vertical extension 56' and is aligned directly opposite to the drive magnet block 44'. As best seen from FIG. 10, each of the magnet blocks 44' and 58' is provided with a series of circumferentially spaced elongated magnets of opposite polarity, those magnets in the drive magnet block 44' being designated as $M_1$ and $M_2$. Conversely, a series of elongated magnets of opposite polarity $M_3$ and $M_4$ are mounted in the slave magnet block 58' and are of opposite polarity to one another as well as to those in the drive magnet block. The magnets M1-M4 are preferably made of Vesculite™. Accordingly, when the drive motor is energized each of the magnets $M_1$ and $M_2$ in the drive magnet block will be attracted to the aligned slave magnets $M_3$ and $M_4$ to impart rotation to the slave magnet block and its attached lower extension 56' of the arm 50'. Utilizing banks of magnets of opposite polarity as described has been found to increase the magnetic intensity and locking engagement between the drive magnet block 44' and outer slave or follower block 58'. In addition, the lower extension arm 56' is positively attached to the roller belt 80 which completely encircles the lower extension 56' and is provided with rollers 82 at spaced circumferential intervals in the belt 80 to avoid any frictional resistance between the belt and the stationary globe 19. The rollers 82 serve to substantially reduce the frictional resistance between the belt 80 and the outer surface of the globe extension as well as to achieve better tracking.

Figures 11, 12:
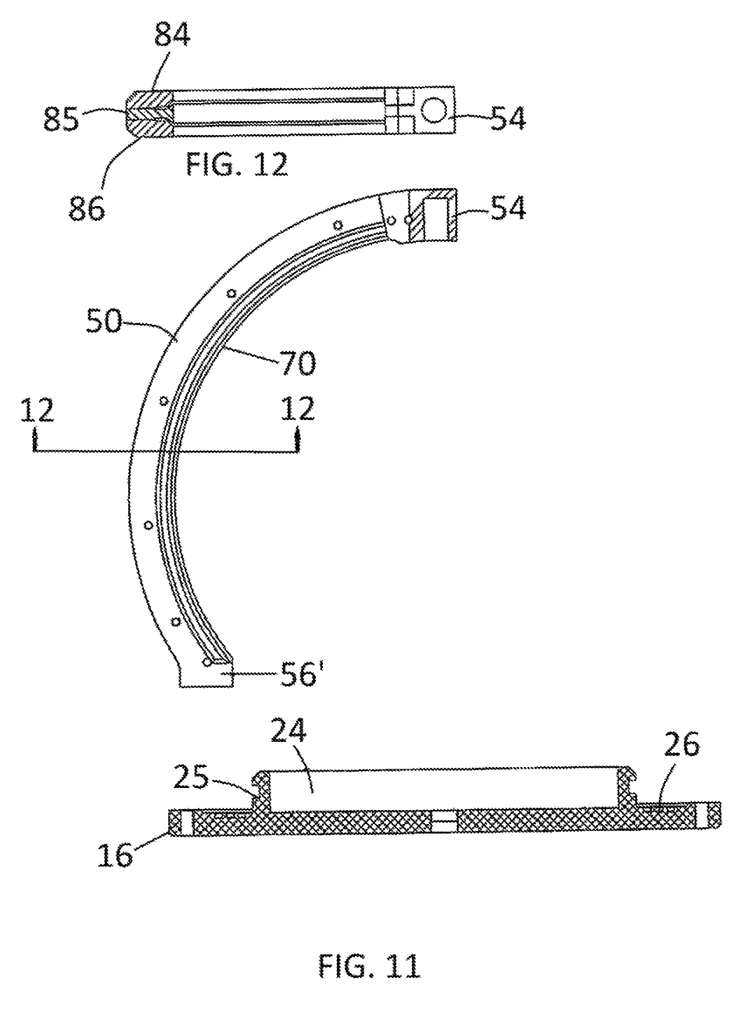
FIG. 11 is an exploded view of the cleaning arm and system base shown in FIGS. 8 to 10.
FIG. 12 is a cross-sectional view taken about lines 12-12 of FIG. 11.

As shown in FIGS. 11 and 12, the cleaning arm 50 is divided into three lengthwise strips or sections 84, 85 and 86 which are fastened together to wedge the scrubbing element or blade into the groove formed between the sides 84 and 86 and center section 85. The lower end 56' of the cleaning arm is inserted into a slot in the intermediate portion of the magnet block 58' and the magnet strip $M_3$ and $M_4$ on the upper surface of the magnet block 58' is inset into the belt 80.

DETAILED DESCRIPTION OF THIRD EMBODIMENT

Figure 13:
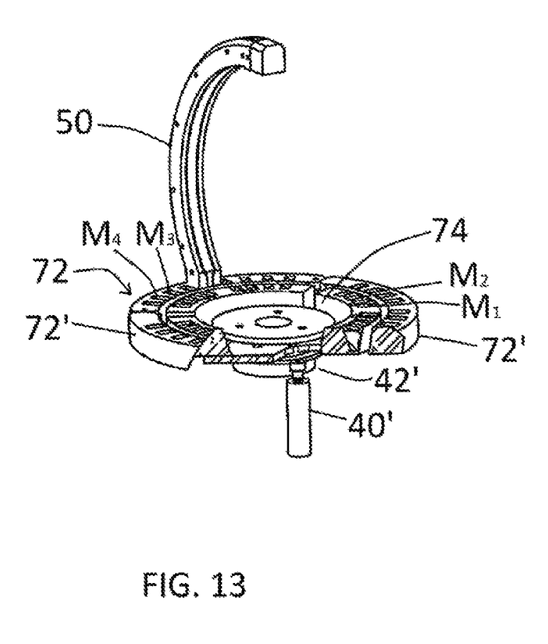
FIG. 13 is a perspective view of another form of magnetic drive mechanism for the cleaning arm.

In a third embodiment of FIG. 13, like parts of those of FIGS. 8-12 are correspondingly enumerated and once again illustrates upward extension of a cleaning arm 50 which is of arcuate configuration corresponding to the upper spherical portion 19 of the housing 18 illustrated in FIG. 8 to traverse the entire vertical extent of the spherical wall surface 19 between upper post 52 and the juncture of the spherical wall 19 with the cylindrical wall 20. A lower vertical extension 56 of the arm 50 is anchored in an outer slave magnet block 72 which completely encircles the circular wall 20 in the same manner as described with respect to the magnet blocks 58 of FIGS. 8 and 9. In this relation, the magnet blocks 72 are comprised of four arcuate sections 72' which completely encircle the lower circular wall 20 and the arcuate sections are joined together with rollers, not shown, but which correspond to the rollers 82 illustrated in FIG. 10 which engage the outer surface of the circular wall 20 in order to permit free rotation of the magnet block assembly 72 around the circular wall. In turn, a drive magnet block assembly 74 is mounted for rotation in the same manner as illustrated and described with respect to FIGS. 8-10 but consist of a series of arcuate sections in end-to-end relation as illustrated so as to be coextensive with the outer blocks 72 and is driven by a motor drive 40' via pinion gear 42' as shown in FIG. 10. Each of the arcuate sections of the magnet blocks 72 contain a series of circumferentially spaced elongated magnets of opposite polarity which are designated at $M_1$ and $M_2$; and a series of magnets of opposite polarity $M_3$ and $M_4$ are mounted in the outer slave magnet block 74. Again, when the drive motor is energized, each of the magnets $M_1$ and $M_2$ in the drive magnet block will be attracted to the aligned slave magnets $M_3$ and $M_4$ to impart rotation to the slave magnet block 72 and the arm 50. It is then found that utilization of magnets around the entire circumference of the wall 20, coupled with the spaced rollers at uniformly spaced intervals around the entire circumference will stabilize the cleaning arm and achieve better tracking and magnetic intensity.

It is therefore to be understood that various modifications and changes may be made in the specific construction and arrangement of the elements without departing from the spirit and scope of the embodiments herein illustrated as described in the following claims.

We claim:

1. In a camera for submersible or above water monitoring activities having a transparent, waterproof enclosure, the improvement comprising:

an outer cleaning arm mounted for alignment around an external surface of said enclosure, said arm being of a configuration substantially conforming to the contour of said enclosure;

drive means associated with said cleaning arm for periodically activating said cleaning arm for advancement at predetermined, spaced time intervals;

a drive magnet mounted for rotation internally of said enclosure; and said cleaning arm including a slave magnet of opposite polarity to said drive magnet and mounted externally of said enclosure.

2. In a camera for submersible or above water monitoring activities according to claim 1 wherein said external surface of said enclosure is curved.

3. In a camera for submersible or above water monitoring activities according to claim 1 wherein said enclosure is of generally spherical configuration.

4. In a camera for submersible or above water monitoring activities according to claim 3 wherein said enclosure terminates at one end in a lower generally circular wall.

5. In a camera for submersible or above water monitoring activities according to claim 4 wherein said cleaning arm includes at least one wiper blade of arcuate configuration extending between said circular wall at one end and an opposite closed end of said enclosure, said enclosure having an external mounting portion at said opposite end engageable with an end of said cleaning arm.

6. In a submersible camera according to claim 5 wherein said cleaning arm is in journaled relation to a center post.

7. In a submersible camera according to claim 1 wherein said slave magnet is in alignment with said drive magnet, and motive drive means for rotating said drive magnet.

8. In a submersible camera according to claim 7 wherein said drive magnet and said driven magnet are both of arcuate configuration conforming to the curvature of said circular wall of said enclosure and being mounted in close proximity to the inner and outer surfaces of said wall.

9. In a submersible camera system having a transparent, waterproof enclosure of generally spherical configuration, the improvement comprising:

an outer cleaning arm mounted for rotation around an external surface of said enclosure, said arm being of arcuate configuration and having a groove in facing relation to said enclosure, and a cleaning insert mounted in said groove substantially conforming to the curvature of said enclosure;

drive means associated with said cleaning arm for periodically activating said cleaning arm at predetermined, spaced time intervals; and a series of drive magnets mounted for rotation around the inner surface of said enclosure, and a series of slave magnets mounted externally of said transparent enclosure.

10. In a submersible camera system according to claim 9 wherein said insert is a flexible blade.

11. In a submersible camera system according to claim 10 wherein said insert includes a metal scraper.

12. In a submersible camera system according to claim 9 wherein said series of drive magnets are mounted on an arcuate drive block and said series of slave magnets are mounted on an arcuate magnet block in aligned relation to said drive magnets.

13. In a submersible camera system according to claim 12 wherein said external cleaning arm is mounted on said slave magnet block and said slave magnet block is mounted in a band encircling said transparent enclosure and provided with rollers in journaled rotational engagement with said transparent enclosure.

\* \* \* \* \*